United States Patent [19]

Ducote

[11] Patent Number: 5,071,152
[45] Date of Patent: Dec. 10, 1991

[54] REMOTE-STEERING TRAILER

[76] Inventor: Edgar A. Ducote, P.O. Box 45654, Baton Rouge, La. 70895

[21] Appl. No.: 682,106

[22] Filed: Apr. 25, 1991

Related U.S. Application Data

[62] Division of Ser. No. 337,292, Apr. 13, 1989, Pat. No. 5,026,085.

[51] Int. Cl.⁵ .............................................. B62D 53/06
[52] U.S. Cl. ................................... 280/426; 280/433; 280/442
[58] Field of Search .................. 280/400, 405.1, 407.1, 280/419, 423.1, 426, 433, 442, 443; 180/134, 136-138

[56] References Cited

U.S. PATENT DOCUMENTS

| | | |
|---|---|---|
| 1,619,941 | 3/1927 | Kennedy . |
| 2,286,166 | 6/1942 | Carmody .......................... 280/33.55 |
| 2,925,285 | 2/1960 | Haas ................................. 280/426 |
| 2,959,428 | 11/1960 | Felburn .............................. 280/426 |
| 3,092,398 | 6/1963 | Droeske ............................. 280/426 |
| 3,149,858 | 9/1964 | Gilbert .............................. 280/442 |
| 3,533,644 | 10/1970 | Humes ............................... 280/426 |
| 3,712,641 | 1/1973 | Sherman ............................. 280/426 |
| 3,734,538 | 5/1973 | Humes ............................... 280/426 |
| 4,017,094 | 4/1977 | Pilcher .............................. 280/404 |
| 4,120,509 | 10/1978 | Reeve ............................... 280/81 A |
| 4,244,596 | 1/1981 | Chung ............................... 280/426 |
| 4,441,730 | 4/1984 | Damm ................................ 280/426 |
| 4,463,966 | 8/1984 | Stoddard ............................ 280/442 |
| 4,468,047 | 8/1984 | McGhie et al. ...................... 280/419 |
| 4,484,758 | 11/1984 | Murray et al. ....................... 280/442 |
| 4,570,965 | 2/1986 | Caswell ............................. 280/426 |
| 4,740,006 | 4/1988 | Ducote .............................. 280/426 |

FOREIGN PATENT DOCUMENTS

| | | | |
|---|---|---|---|
| 1957662 | 5/1971 | Fed. Rep. of Germany ...... | 280/442 |
| 2200739 | 7/1973 | Fed. Rep. of Germany ...... | 280/426 |
| 2312565 | 9/1974 | Fed. Rep. of Germany ...... | 280/426 |
| 94330 | 4/1960 | Netherlands ........................ | 280/426 |
| 556066 | 6/1977 | U.S.S.R. ............................. | 280/442 |
| 765083 | 9/1980 | U.S.S.R. ............................. | 180/134 |

OTHER PUBLICATIONS

*Encyclopedia Brittannica*, vol. 18, pp. 721-723, Chicago: Encyclopedia Britannica, Inc, 15th edition.

Primary Examiner—Charles A. Marmor
Assistant Examiner—Anne Marie Boehler
Attorney, Agent, or Firm—Reginald F. Roberts, Jr.

[57] ABSTRACT

A steering system for use in a towing vehicle-trailer combination, wherein all trailer axles are load-bearing and fixed. The rearmost axle on the trailer has directional wheels that automatically adjust to the direction of motion of the rear wheels of the towing vehicle. The motive force for steering the directional wheels emanates from a sensor nested in the V-slot of the fifth wheel of the towing vehicle. The steering system is designed to be installed as a retrofit to existing trailers, or as optional equipment for trailers not yet manufactured. Abling and disabling the system is automatic. Abling takes place when the fifth wheel is moved into position to couple the king pin under the trailer. The system is disabled when locking lugs for the fifth wheel are released, and the fifth wheel moves away from the king pin.

6 Claims, 11 Drawing Sheets

REMOTE-STEERING TRAILER

This is a division of application Ser. No. 337,292 filed Apr. 13, 1989 now U.S. Pat. No. 5,026,085.

BACKGROUND OF THE INVENTION

The present invention relates to steering. More particularly, the invention relates to steering towed mobile vehicles by remote control.

As used herein, the term "axle" is defined as a shaft which connects wheels located on opposite sides of a frame which is supported by the shaft and by springs connected thereto. The term "short axle" is defined as a shaft which connects a pair of wheels located on the same side of the frame. The term "spindle" is defined as a short conical shaft on which a wheel is mounted.

The term "fixed axle" is defined as an axle the orientation of which remains unchanged with respect to a frame which the axle supports. The term "steerable axle" is defined as an axle which is capable of changing direction with respect to and independently of a frame which the axle supports. The term "fixed wheel" is defined as a wheel the orientation of which remains unchanged with respect to an axle on which the wheel is mounted. The term "steerable wheel" is defined as a wheel which is capable of changing direction with respect to and independently of a fixed axle to which the wheel is connected by a spindle.

Trucks, tractors, and trailers are well described in the *Encyclopedia Britannica*, volume 18, pages 721–723, hereby incorporated by reference.

Tractor-trailer combinations known as "eighteen-wheelers" present special problems. FIG. 1 shows a top plan view of a first type of eighteen-wheeler presently in use, generally denoted by the numeral 9. The frame 10 of a trailer 2 is supported near the front by the frame 7 of a tractor 1. The frame 7 is supported by a fixed front axle 4 provided with a pair of steerable wheels 3 mounted on a pair of spindles 6, and by two fixed rear axles 4, each of which is provided with two pairs of fixed wheels 3a. The trailer frame 10 is further supported by two fixed axles 4 near the rear of the trailer 2. Each of these rear axles 4 is likewise provided with two pairs of fixed wheels 3a. A "fifth wheel" 8 is fastened to the frame 7 of the tractor 1.

There are serious disadvantages inherent in the eighteen-wheeler 9. The following examples are illustrative of the problems inherent therein.

(1) Because the only axles supporting the frame 10 of the trailer 2 are the two rear axles 4, approximately half the weight of the trailer 2 is borne by the frame 7 of the tractor 1. An immediate consequence of this burden on the tractor 1 is that tractors pulling eighteen-wheelers must be large, heavy, and rugged enough to bear about half the weight of the trailer and of the payload, as well as the weight of the tractor itself. Clearly, if part of this extra weight could be borne by the trailer, it would be possible to utilize lighter and less expensive tractors. Furthermore, the portion of the fuel utilized to move the tractor alone could be considerably reduced, leading to even greater savings and to a significant advantage in fuel economy and energy conservation.

(2) Because there are only fixed wheels 3a supporting the trailer 2, it is impossible for the trailer 2 to turn without some of the wheels 3a skidding or dragging to some extent. The farther apart the rear axles 4, the more serious is the problem of wheel drag. This problem causes loss of control, wasteful loss of rubber from the tires mounted on the wheels 3a, and wasteful loss of the extra energy required to overcome sliding friction as opposed to rolling friction. The trailer 2 is unstable in a turn. The faster the speed and the sharper the turn, the greater the instability.

(3) The fifth wheel 8 of the tractor 1 furnishes a leg to support the front end of the trailer 2. However, it does not furnish full support for the full width of the front end of the trailer 2. This deficiency causes the bed (not shown) of the trailer 2 to rock down on one side and up on the other side. The extent to which such rocking occurs depends on the turns that the trailer 2 makes, the imbalance of the load (which can be caused by shifting of the cargo in transit), road conditions, and other variables. This particular type of instability is almost continuous while the eighteen-wheeler 9 is in motion.

(4) Often the longitudinal center of the trailer, when loaded, is in continual up-and-down motion. This motion contributes to the instability of the trailer 2, and may in extreme cases cause the trailer 2 to collapse at the longitudinal center.

(5) The looseness of the trailer king pin (not shown) in the fifth wheel 8 of the tractor 1 causes some shock, which contributes to a deficiency in traction and to a rough ride for both cargo and driver.

(6) Tandem axles are not equivalent to two single axles. Transportation authorities do not allow as much weight to be carried by a pair of tandem axles as by a pair of single axles.

(7) Tandem axles on either the tractor 1 or the trailer 2, because they drag in a turn, can individually or in combination initiate a slide of the eighteen-wheeler 9 into a "jack-knife."

(8) The trailer 2 cannot independently furnish braking for the trailer and its payload (not shown). The push of the trailer 2 against the tractor 1 when brakes are applied to the tractor 1 causes the tractor 1 to yaw.

(9) There is nothing between the trailer 2 king pin (not shown) and the rear axles 4 of the eighteen-wheeler 9 to function as a load-bearing stabilizer for the trailer 2. It is part of the function of the massive tractor 1 to counteract the sideward pull of the trailer 2 upon the tractor 1 when the tractor changes direction at highway speeds. The shaper the turn and the faster the speed, the greater is the pull of the trailer 2 on the tractor 1.

(10) The existence of the problems just enumerated has caused the gradual emergence of heavier and more massive tractors 1. These massive tractors have larger engines. The role of the tractor 1 is to pull, to steer, and to give stable traction to the eighteen-wheeler 9 while carrying its cargo at highway speeds. The heavier tractors 1, along with Transportation Department load limits on tandem axles 4, cause the eighteen-wheeler 9 to carry less of a payload. The increased horsepower of the tractor 1 engines (not shown) causes less fuel efficiency. These factors, in combination, raise the cost per ton-mile of freight substantially.

In an attempt to alleviate these problems, prior-art devices have utilized steerable axles with fixed wheels for eighteen-wheelers; see, for example, U.S. Pat. Nos. 3,149,858, 3,533,644, 3,712,641, 3,734,538, 4,120,509, 4,244,596, and 4,463,966. Special devices have also been devised for steering goose-neck trailers, the devices including steerable short axles, wheels steered by friction against the road, and rear wheels forcibly steered from the fifth wheel of the tractor.

These prior-art devices are expensive to manufacture and maintain; and, because of their specialized design, of limited utility. Additionally, the devices and methods described in these patents are not effective for negotiating high-speed turns on highways and public streets. They are, moreover, difficult to connect and disconnect. More specifically, when steerable axles are used to make a turn, the base of support provided by the axle is diminished proportionately to the degree of the turn.

More recently, a significant advance in the technology was made by Ducote, as disclosed by U.S. Pat. No. 4,740,006. Ducote discloses a steering system for use in a tractor-trailer combination in which all trailer axles are load-bearing and fixed. The rearmost axle on the trailer has fixed wheel mountings, and serves as a pivot for turning the trailer when the trailer moves in either forward or reverse direction. The axle or axles located forward of the rearmost axle of the trailer and aft of the trailer king pin has or have directional wheels which automatically track and follow in concentric pattern the path of the rear wheels of the tractor. The force for steering the directional wheels emanates from a sensor nested in the V-slot of the fifth wheel of the tractor. The system is capable of being retrofitted to existing trailers, or optionally being used as equipment for trailers not yet manufactured. Ducote's patent is incorporated herein by reference.

While Ducote's invention represents a tremendous advance over existing technology for solving the problems enumerated above, there have since come into prominence trailers with spread-tandem axles. As stated above, the greater the spread of the tandem axles, the more serious the problem of wheel-drag becomes. Spread-tandem axles are conventionally separated by a distance of about ten feet. Such a trailer is shown in FIG. 2 and designated by the numeral 2a.

These rigid spread-tandem axles with fixed wheels add another dimension to turning, in that these spread axles must be dragged around to make the turn. The distance by which the tires and wheels are dragged depends on the individual axle loads and the road surface under each of the tires. In any case they must be dragged into alignment, for every turn that the rig makes. To compensate for this sideways dragging, the driver makes an extra-wide turn. So, in the first place the driver turns wide to accomodate the length of the trailer; and in the second place, the driver turns wider yet to have additional distance for the dragging and inability of the rigid tandems to turn. The reason that the rigid spread tandems are used in that they are allowed the axle weight of single axles. This allowable weight is 20,000 pounds per axle. This helps them get through the Department of Transportation weight scales. This severe problem is evident at the access and exit ramps of interstate highways.

These problems are always with the driver. When driving in cities, the driver must find an intersection at which the driver is able to make a turn. The turn that is made is seldom an easy turn; it is a turn that the driver is barely able to make. Thus the driver and the rig must roll until the driver is able to find a suitable intersection. The time spent finding this begins at the point that the vehicle is loaded, and ends at the point the load is discharged.

"Sliders" are rear-axle groups mounted as a truck which is slidable on the beams of the trailer. One function of the slider is to shorten the wheelbase when the rig is unable to back into a tight place for unloading. When the driver sees that he or she is unable to back into an unloading spot, the driver parks the rig, gets out of the cab, manually unlocks the slider, gets back into the cab, locks the wheels of the slider, then backs up a few feet to shorten the wheelbase. The driver parks the rig again, and gets out of the cab again, and locks the slider again in this new position under the trailer. He or she gets back into the cab a third time, and backs the rig to a spot where it can be unloaded. Though the driver has shortened the wheelbase, it is still usually not short enough. The driver will still run over curbs and medians, in order to get the rear or the trailer to the right spot.

"Extendables" are semi-trailers that telescope out to accommodate the length of reinforced concrete pilings, steel beams, and other structural members. These extended trailers have aggravated problems in turning because of their extra length.

Military semis are used to transport tanks and other military vehicles and equipment. These long semi-trailers have all of the problems of other long semi-trailers. Additionally, they are used in peaceful transport of military vehicles in old-world cities. The streets in many of these old-world cities are narrow, having been built for horse-drawn vehicles.

Transportation needs have caused semis to be built longer as time goes on. The longer the semi-trailer, the more difficult it is for the tractor-trailer 9a (FIG. 2) to get around an intersection or make a turn. There are many instances every day of tractor-trailers intruding in the adjacent lanes of traffic to make a turn. This is a dangerous practice, and disrupts traffic that is sometimes already heavy. Another problem is that the rear wheels of the trailer 2a ride over the curbs, sidewalks, and medians. This demolishes curbs and street signs, and brushes utility poles, which is damaging to both the trailer and the utility pole. This problem is particularly severe at intersections and ramps that lead to and from interstate highways.

Emergency vehicles and hook-and-ladder semis for fire-fighting have a greater problem with this situation because of the length of the semi-trailers.

To alleviate the problems arising from spread axles, dump valves are being used for one of the two axles on the spread. By exhausting the air springs of one axle, the axle no longer is under load and can travel through a tight curve more easily. Most spread-tandem platforms dump the air from the rearmost axle. By doing so, the platform has the maneuverability of a trailer that is significantly shorter.

Suspension manufacturers teach that the dump-valve system was intended for limited use, such as tight ninety-degree turns, backing into loading docks, maneuvering within a yard, and other "creep-speed" applications. But the improved maneuverability is leading some drivers to dump air when making moderate curves at speeds of about thirty miles per hour.

Accordingly, some trailer and component manufacturers are starting to object to what they consider abuse of the dump valve. The Spicer Trailer Products Division of Dana Corporation issued an engineering update stating that the company would not warrant the axles used on spread-axle trailers equipped with dump valves. In pertinent part, the update reads as follows:

"When a dump valve is actuated, the axle equipped with the dump system sees only its own weight and that of the attached suspension components, unless a regulator is used to maintain some air pressure in the air bag.

The other axle sees the full load normally carried by both axles, causing severe overloading of that axle. Unless such dump valves can be provided to automatically apply air pressure above speeds of five mph, Spicer Trailer Products does not approve, and will not warrant axles used on spread axle trailers equipped with dump valves."

Great Dane does not offer dump valves on spread-axle platforms for increasing maneuverability or reducing tire-scuffing. "We will put dump valves on both axles in order to control dock height, but we won't put them on just one axle," states Paul Crabtree, manager of engineering at Great Dane's platform plant im Memphis, Tennessee. "We will put them on lift axles if a tandem is already in place, because we are assuming that the trailer will be operated with the axle lifted. The trailer will have to be built to handle that."

Clearly, these attempts by the prior art to solve problems associated with spread-tandem axles on eighteen-wheelers fall far short of providing satisfactory solutions to these problems.

SUMMARY OF THE INVENTION

In general, the present invention in one aspect provides a trailer steered by remote control. The trailer is supported by a plurality of steerable wheels pivotally connected to a first fixed axle near the rear end of the trailer, and by a plurality of fixed wheels mounted on a second fixed axle. The second axle is disposed approximately midway between the first axle and the longitudinal center of the trailer. Means are provided for coupling the trailer to towing means, and for sensing the direction of motion of the towing means. Means are further provided for forcibly steering the steerable wheels supporting the trailer in accordance with the sensed direction of motion of the towing means, thereby steering the trailer by remote control.

In a second aspect, the invention provides a stabilized tractor-trailer combination. The trailer is articulated to the tractor, which has a conventional fifth wheel. The trailer includes a plurality of steerable rear wheels pivotally connected to a first fixed axle, and a plurality of fixed wheels mounted on a second fixed axle. The second axle is disposed approximately midway between the first axle and the longitudional center of the trailer. A directional sensor disposed within the fifth wheel senses the direction of motion of the tractor, and the steerable wheels of the trailer are forcibly steered in accordance with the sensed direction of motion of the tractor.

In a third aspect, the invention provides a directional sensor conformable to a slot in a fifth wheel of a tractor articulated to a trailer. The sensor comprises a flexible, substantially triangular member including first, second, third, and fourth sides. The first side defines a base of the triangular member. The second and third sides extend from the first side to the fourth side. The fourth side defines a vertex of the triangular member, the fourth side being substantially shorter than the first, second, and third sides. The first side includes an opening opposite the fourth side.

The sensor further comprises a sealed first hollow, elongated member which extends from the first side of the triangular member away from the fourth side of the triangular member.

The sensor further comprises a close-fitting, freely movable, flexible second hollow elongated member. The second elongated member is closed at one end, the other end being open and continuous with the opening in the first side of the triangular member. The second elongated member is substantially shorter than the first elongated member.

The sensor further comprises a first compartment, which extends from the closed end of the second elongated member to one end of the first elongated member. A second compartment extends from the fourth side of the triangular member to the closed end of the second elongated member.

The sensor is provided with a first inlet, for admitting a pressurized fluid into the first compartment, thereby pressure-loading the sensor into the fifth wheel; and with a second inlet, for admitting a pressurized fluid into the second compartment, thereby inflating the second compartment and maintaining the sensor in pressurized contact with the outer surface of the slot in the fifth wheel.

In a fourth aspect, the present invention provides a second embodiment of a directional sensor conformable to a slot in a fifth wheel of a tractor articulated to a trailer.

The sensor comprises an elongated passageway having a closed end and an open end. A first spring is disposed in the elongated passageway. One end of the first spring is fastened to the closed end of the passageway.

The sensor includes a straight, rigid member disposed in the elongated passageway. One end of the rigid member is fastened to the other end of the first spring. The other end of the rigid member is connected to a gear in a power train fastened to the trailer. The rigid member compresses the first spring and forces the sensor into the slot in the fifth wheel of the tractor.

The sensor further comprises first and second compartments having open ends. The first and second compartments are connected across the elongated passageway. The walls of the first and second compartments are connected to one another by a second spring, which holds the outer surface of the walls of the first and second compartments in pressurized contact with the outer surface of the slot in the fifth wheel. The second spring supports the elongated passageway.

In a fifth aspect, the invention provides a third embodiment of a directional sensor for a tractor articulated to a trailer. The sensor comprises (a) means for sensing the direction of motion of the tractor, (b) electronic means for receiving from the sensing means a first signal indicative of the sensed direction of motion of the tractor, and (c) electronic means for transmitting to the trailer a second signal indicative of the direction of motion of the tractor and of the geometry of the tractor and of the trailer.

In a sixth aspect, the invention provides a fourth embodiment of a directional sensor conformable to a slot in a fifth wheel of a tractor articulated to a trailer. The sensor comprises an elongated passageway having a closed end and an open end. A first spring is disposed in the elongated passageway. One end of the first spring is fastened to the closed end of the passageway. A straight rigid member is also disposed in the pasageway. One end of the rigid member is fastened to the other end of the first spring. The other end of the rigid member is fastened to a gear in a power train mounted on the trailer. The rigid member compresses the first spring and forces the sensor into the slot in the fifth wheel of the tractor.

The sensor further comprises first and second compartments connected to first and second sides of the elongated passageway by second and third springs, respectively. The second and third springs hold the outer surface of the walls of the first and second compartments in pressurized contact with the outer surface of the slot in the fifth wheel.

In a seventh aspect, the invention provides a fourth embodiment of a directional sensor for sensing the direction of motion of a first mobile vehicle articulated to and towing a second mobile vehicle. The sensor comprises a rigid, elongated passageway. A first end of the passageway is rigidly fastened to the rear end of the frame of the first vehicle. The second end of the passageway is rigidly fastened to a gear in a power train adapted to forcibly steer the second vehicle in accordance with the sensed direction of motion of the first vehicle.

A first rigid elongated member is disposed in the passageway. A first end of the first elongated member is rigidly fastened to the rear end of the frame of the first vehicle. The second end of the first elongated member is fastened to one end of a spring disposed in the passageway.

A second rigid elongated member is also disposed in the passageway. A first end of the second elongated member is fastened to the other end of the spring. The second end of the second elongated member is fastened to the gear in the power train.

In an eighth aspect, the invention provides a method for transferring the direction of motion of a first mobile vehicle to an articulated second mobile vehicle. The method comprises the following steps.

(a) Programming a microprocessor to receive a first signal indicative of the sensed direction of motion of the first vehicle, and to transmit a second signal indicative of the sensed direction of motion and of the geometry of the first and second vehicles to a servomechanism which controls the direction of motion of at least one pair of steerable wheels supporting the rear end of the second vehicle.

(c) Activating the microprocessor to recieve the first signal, and to transmit the second signal.

In a ninth aspect, the present invention provides a method for automatically articulating a first steerable mobile vehicle to a second steerable mobile vehicle, and for disengaging the first and second mobile vehicles. The method comprises the following steps.

(a) Providing frames for the first and second vehicles.

(b) Fastening a fifth wheel, which includes a slot therein, to the top of the frame of the first vehicle, and fastening a king pin to the bottom of the frame of the second vehicle.

(c) Providing a directional sensor which can be pressure-loaded into the fifth wheel. The sensor is responsive to the direction of motion of the first vehicle.

(d) Disposing the sensor between the fifth wheel and a member fastened to the frame of the second vehicle.

(e) Moving the first vehicle into position to couple the fifth wheel of the first vehicle to the king pin of the second vehicle, thereby pressure-loading the sensor into the slot of the fifth wheel and coupling the fifth wheel to the king pin.

(f) Locking the fifth wheel to the king pin, thereby articulating the first and second mobile vehicles.

(g) Unlocking the fifth wheel from the king pin.

(h) Moving the first vehicle away from the second vehicle, thereby disengaging the first and second vehicles.

In a tenth aspect, the present invention provides an improvement over prior-art apparati and methods for steerable trailers articulated to tractors equipped with a fifth wheel. Thus, in a steerable trailer equipped with a plurality of fixed wheels mounted on a fixed axle, and steerable wheels pivotally connected to a fixed axle and forcibly steered in response to the sensed direction of motion of a tractor articulated thereo, the improvement comprises disposing at least one pair of the steerable wheels near the rear end of the trailer, and disposing the fixed wheels approximately midway between the longitudional center of the trailer and the pair of steerable wheels near the rear end of the trailer.

DETAILED DESCRIPTION OF THE INVENTION

As is well known, tractors which are used to pull trailers include a device known as a "fifth wheel." The fifth wheel is a slotted plate fastened to the frame above the tandem rear axles of the tractor. The slotted portion of the plate defines, approximately, the latter "V."

Figure 3:
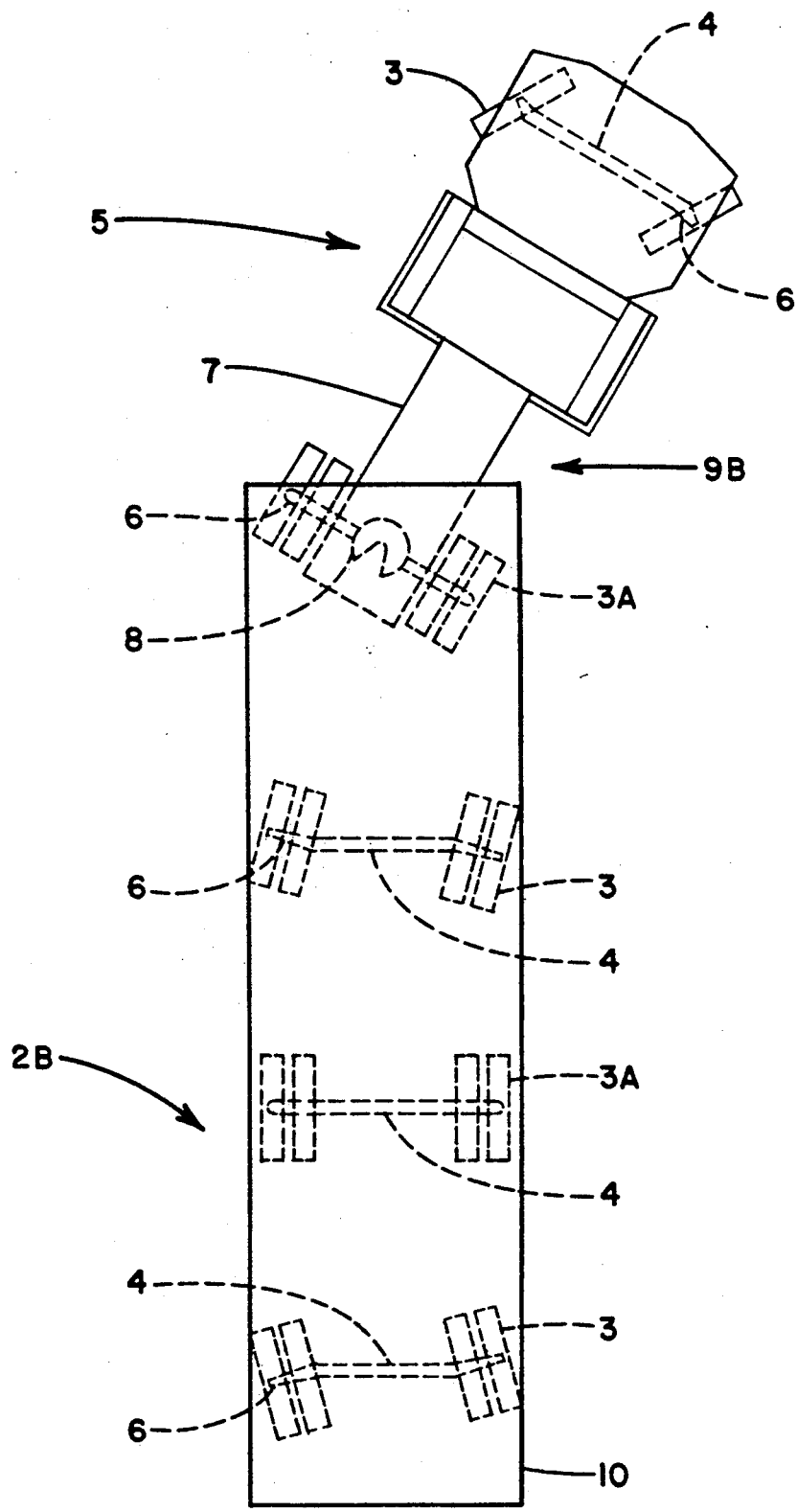
FIG. 3 is a plan view of a tractor-trailer combination equipped in accordance with the principles of the present invention.

More specifically, FIG. 3 shows an eighteen-wheeler 9b equipped in accordance with the principles of the present invention. A tractor 5 includes a frame 7, a pair of steerable front wheels 3 mounted on spindles 6 and pivotally connected by king pins to a fixed axle 4 in the same horizontal plane, two pairs of fixed rear wheels 3a mounted on a second fixed axle 4, and a fifth wheel 8 fastened to the frame 7. The tractor 5 is articulated to a trailer 2b equipped in accordance with the principles of the present invention. The trailer 2b includes four pairs of steerable wheels 3 pivotally connected to two fixed axles 4, and two pairs of fixed wheels 3a mounted on a fixed axle 4. The trailer 2b further includes a frame 10 which supports a body (not shown) such as, for example, a van, a flat bed, or a tank, for supporting or containing a payload. The steerable wheels 3 rotate on spindles 6, which the hung from king pins (not shown) on each end of the fixed axles 4.

Figure 1:
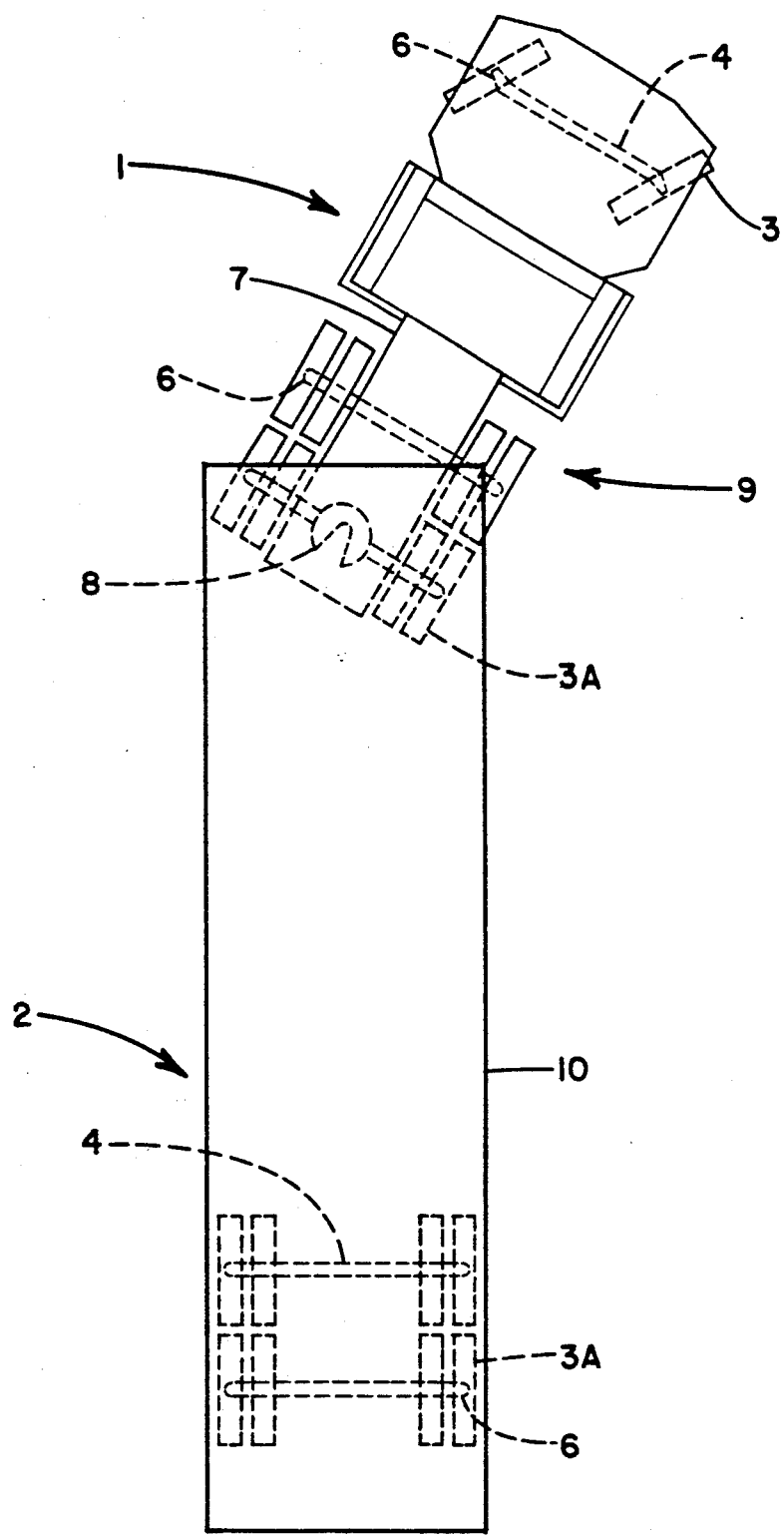
FIG. 1 is a plan view of a prior-art eighteen-wheeler with tandem axles.
Figure 2:
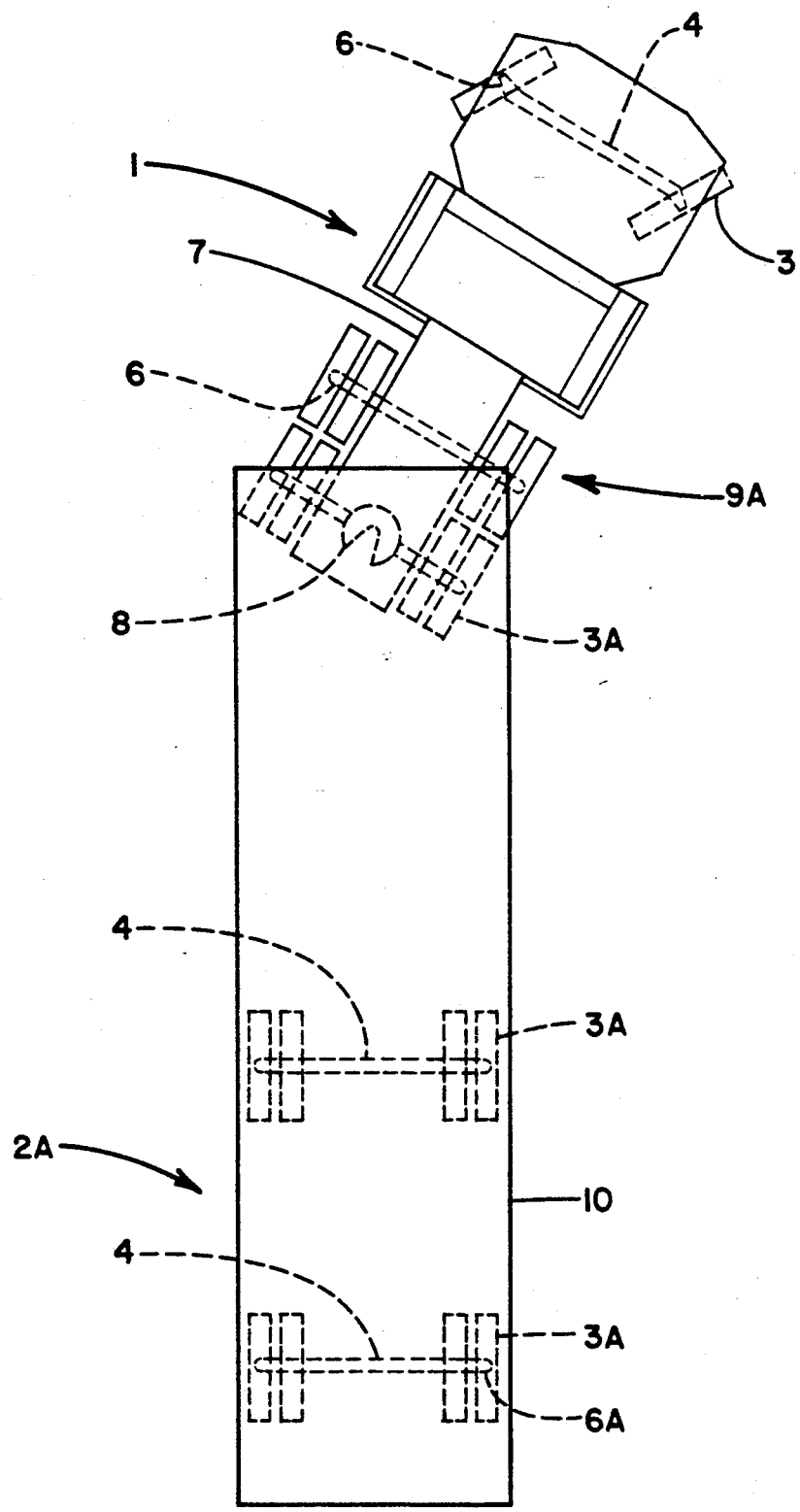
FIG. 2 is a plan view of a prior-art eighteen-wheeler with spread-tandem axles.

By comparing FIGS. 2 and 3, it may be seen that the four pairs of steerable wheels 3 of the stabilized eighteen-wheeler 9b (FIG. 3) beneficially replace two pairs of fixed wheels 3a of the tractor 1 and two pairs of fixed wheels 3a of the trailer 2a (FIG. 2). This modification substantially solves and eliminates the problems previously described for spread-tandem eighteen-wheelers, and offers the following advantages:

(1) More even distribution of weight and momentum when the tractor changes speed or direction of motion.

(2) Greater stability in turns; safer turning capability and maneuverability at high speeds. The higher the speed and the sharper the turn, the more important this aspect of the invention becomes. This feature represents an enormous saving with respect to driving time, and a tremendous safety asset for the prevention of overturning, "jack-knifing," and loss of control.

(3) Heavier pay loads borne safely by trailers modified and equipped according to the principles of the present invention. The increase in pay load is made possible by the use of lighter tractors, and by the increased stabilization and maneuverability of the trailers.

(4) Utilization of standard rather than specialized equipment. With the exception of the invention disclosed by Ducote in his U.S. Pat. No. 4,740,006, steerable prior-art trailers are specially built, usually as a single unit and as special-purpose vehicles. The steering system of the present invention is designed to be installed as a retrofit to present-day state-of-the-art trailers, or as optional equipment for trailers not yet manufactured.

(5) Automatic connecting and disconnecting of the steering system to and from the tractor. Prior-art systems, with the exception of the system disclosed by Ducote's patent, are difficult to connect and disconnect, require special methods and equipment, and require a great deal of time and effort.

(6) An eighteen-wheeler with five single axles. There are no tandem axles; hence the disadvantages and limitations of the tandem axles are eliminated. The axle and wheels 4, 3 at or near the front end of the trailer span the entire width of the trailer, thereby providing positive and independent support for the front end of the trailer. The steerable front wheels 3 of the trailer absorb the pull to either side of the front end of the trailer 2b during turns, and reinforce the support provided by the fifth wheel of the tractor. The front wheels 3 of the trailer 2b act as a damper for the effect of looseness of fit of the trailer king pin in the fifth wheel 8 of the tractor 5. Their fixed, load-bearing axles located aft of the king pin carry a substantial part of the trailer load, and eliminate or substantially reduce any vertical movement at the longitudional center of the trailer. They largely absorb the "dive" at the front of the trailer and the "lift" at the rear end of the trailer 2b during braking. The steerable rear wheels 3 pivotally connected to the rear axle 4 turn as required in order to eliminate wheel-drag. The axle and fixed wheels 3a near the center act as a pivot point.

These features contribute to making the trailer 2b an independently-controlled vehicle. The weight limit allowable for an eighteen-wheeler with five single axles is greater than that for an eighteen-wheeler with tandem axles. A lighter tractor 5 with less fuel consumption can safely pull such an improved trailer 2b. In combination, these factors decrease the cost of fuel per ton-mile for hauling freight by a very significant amount.

The trailer 2b is shown in FIG. 3 as having first and second sets of steerable wheels 3 pivotally connected to first and second fixed axles 4. The first set of steerable wheels 3 are located near the rear end of the trailer 2b, and if only one set of steerable wheels are to be used, that is the preferred location. Even more preferably, however, a second set of steerable wheels 3 is provided near the front end of the trailer 2b. Thus disposed, the two sets of steerable wheels 3 complement one another as just described.

Figure 4:
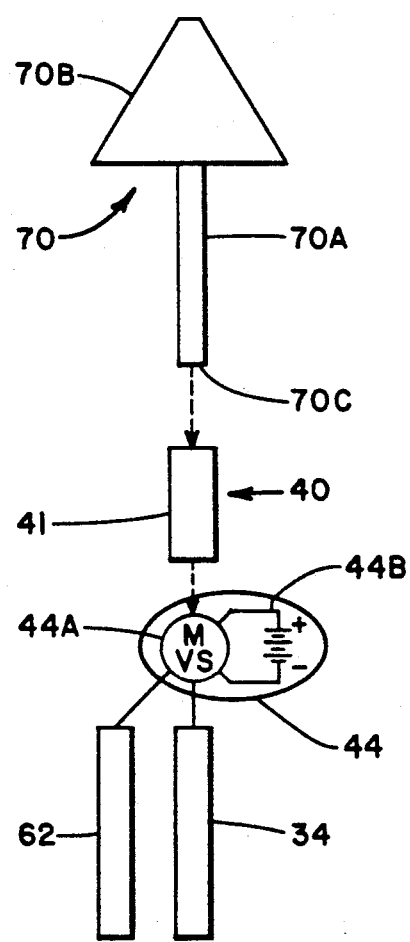
FIG. 4 is a schematic representation of a first embodiment of a power train for a trailer equipped in accordance with the principles of the present invention.

FIG. 4 is a schematic illustration of a first embodiment 40 of a power train for transmitting the direction of motion from a first to a second mobile vehicle. The direction of motion of the first vehicle is sensed by a sensor 70 and communicated to a microprocessor 41 by a first signal which the microprocessor 41 is programmed to receive. The microprocessor 41 then transmits a second signal indicative of the direction of motion of the first vehicle to a servomechanism 44 which controls a steering column 34 or steering arm 62. The steering column 34 or steering arm 62 controls the steerable wheels 3 of FIG. 3. The second signal sent by the microprocessor 41 includes information relative to the geometry of both first and second vehicles.

Although the servomechanism 44 may utilize hydraulic or pneumatic pressure, the servomechanism preferably includes an electric motor 44a. Even more preferably, the motor 44a is a variable-speed, reversible electric motor. Power for operating the motor 44a may be provided, for example, by an electric battery 44b. Alternatively, the electric power may be provided, for example, by an electric generator which is part of the equipment of the first vehicle.

The motor 44a is responsive to the signal received from the microprocessor 41. More specifically, the signal transmitted by the microprocessor 41 to the servomechanism 44 controls the speed and direction of rotation of the rotor (not shown) in the motor 44a. The motor 44a controls the steering column 34 or the steering arm 62, which causes the wheels 3 to turn in accordance with the direction of motion of the first vehicle as sensed by the sensor 70, and with the particular geometry of the first and second vehicles.

The sensor 70 includes an extension 70a. Both first and second vehicles are provided with frames. One end 70b of the sensor 70 is fastened to the frame of the first vehicle, which is used to tow and steer the second vehicle. The other end 70c of the sensor 70 and of the extension 70a is attached to an electrical lead which makes electrical contact with a source of varying electrical potential (not shown). As the position of the sensor 70 changes in response to the motion of the first vehicle, the voltage contacted by the electrical lead attached to the extension 70a changes in a manner indicative of the position of the sensor 70. When the first vehicle is travelling in a straight line, the potential reading is zero. As the first vehicle begins a right turn, the voltage becomes positive, and the magnitude of the voltage is proportional to the degree of turn. When the turn has been completed, the voltage falls to zero. In a similar manner, when the first vehicle makes a left turn, the voltage assumes a negative value. By this mechanism an electrical signal is generated by the sensor 70, which signal is indicative of the direction of motion of the first vehicle. If desired, the electrical polarities may of course be reversed, the zero point displaced toward positive or negative polarity, or the apparatus and method otherwise modified.

While by no means restricted to the following example, one way of making contact between the extension 70a and the source of varying electrical potential would, e.g., be to provide a semicircular member in which the electrical potential varies from a maximum positive value at one end to a maximum negative value at the other end, with zero electrical potential at the midpoint. This specific example, as stated above, is illustrative and by no means limiting.

Upon receiving the signal from the sensor 70, the microprocessor 41 sends a second signal to the servomechanism 44. The second signal is likewise indicative of the direction of motion of the first vehicle, and includes information on the geometry of the first and second vehicles. Either signal or both signals may be transmitted electrically or by radio waves. Electrical transmission comprises the use of an electrical conductor. If either signal is, or if both signals are transmitted by radio, the transmission system includes, for each signal, a modulator, a transmitter, a demodulator, and a receiver. The direction of displacement of the radio wave from the null plane indicates the direction of motion, and the amplitude of the wave indicates the rate of motion of the first vehicle.

While described for use with tractor and trailer, the sensor 70 can clearly be used for other applications such as one boat towing another, a ship towing a barge, or an aircraft towing a glider.

Figure 5:
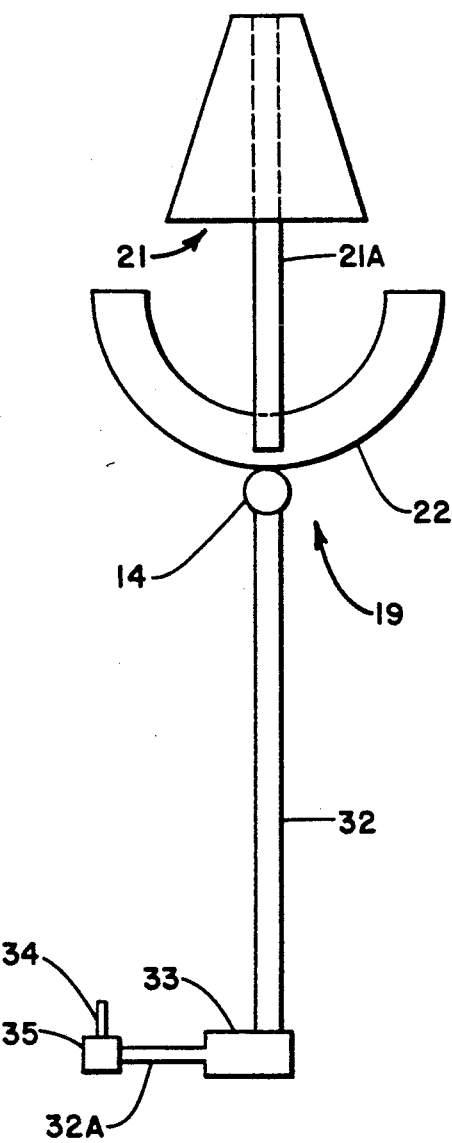
FIG. 5 is a schematic representation of a second embodiment of a power train for a trailer equipped in accordance with the principles of the invention, viewed from above.

FIG. 5 illustrates the component parts of a second embodiment 19 of a power train which acts as a "sixth wheel" for a trailer equipped in accordance with the principles of the present invention. The power train 19 includes a directional sensor 21, disposed within the slot of the fifth wheel 8 of the tractor 5 (FIG. 3). The sensor 21 is pressure-loaded into the slot of the fifth wheel 8, preferably by pressure-loading the extension 21a against one of the other components of the power train 19, all of which are fastened directly or indirectly to the frame 10 of the trailer 2b (FIG. 3). Even more preferably, the sensor 21 is pressure-loaded into the slot of the fifth wheel 8 by pressure-loading the extension 21a against a first gear 22. While the first gear 22 is beneficially positioned as shown in FIG. 5, it will be clear to one skilled in the art that many other positions and modifications of the basic configuration shown are feasible within the scope of the present invention.

The first gear 22 is designed to control the steerable wheels 3 in accordance with the sensed direction of motion of the tractor 5 and with the geometry of the tractor 5 and trailer 2b (FIG. 3). The first gear 22 engages a second gear 14, the lower bevelled portion of which engages one end of a first shaft 32, which acts as a drive shaft. The other end of the drive shaft 32 is coupled to a second shaft 32a through a first gearbox 33. The shaft 32a is coupled to the steering column 34 through a second gearbox 35.

Figure 7:
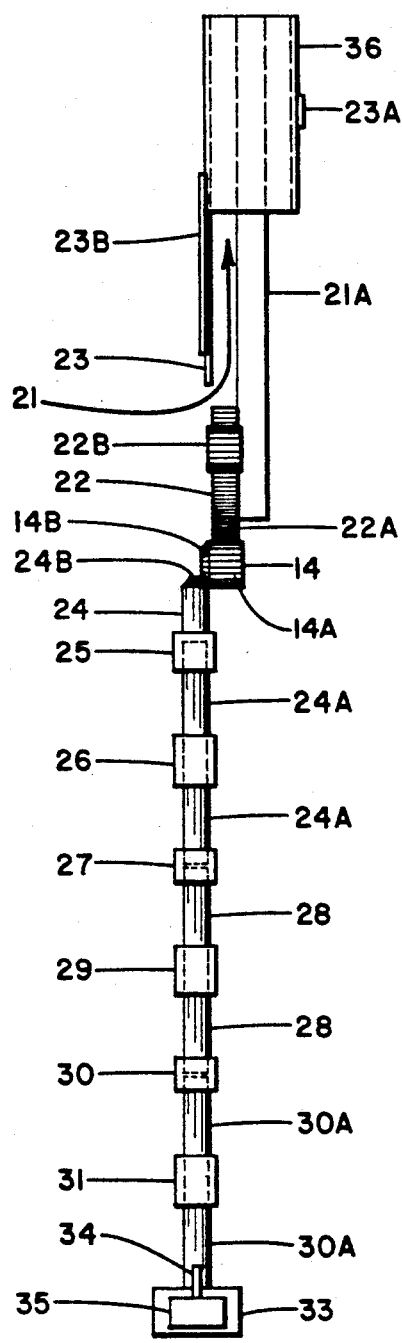
FIG. 7 is a side view of the power train shown in FIG. 6.
Figure 6:
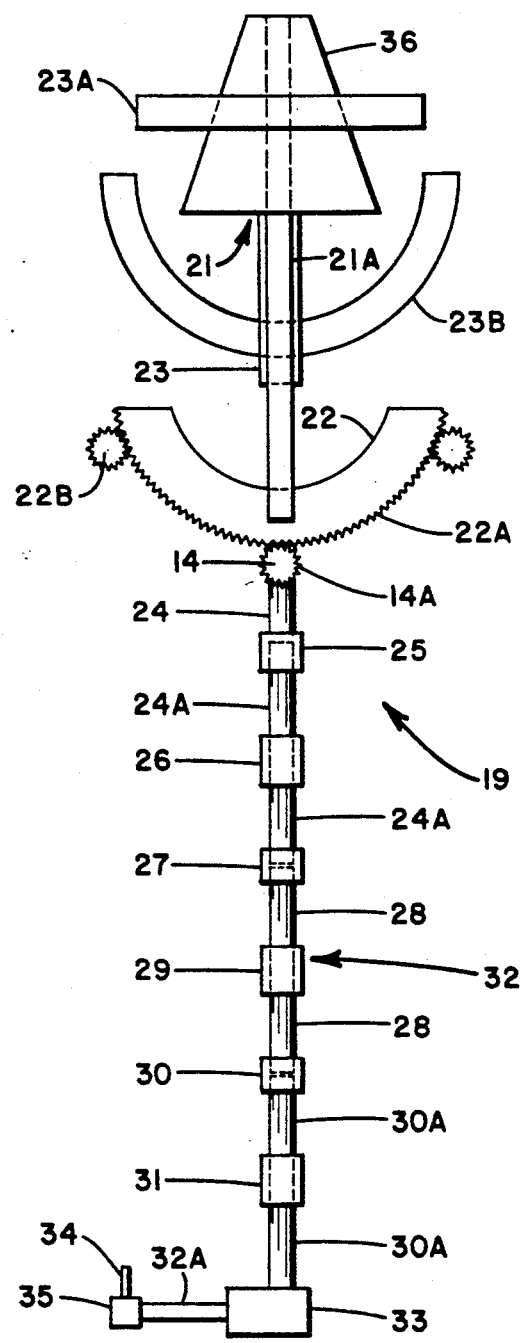
FIG. 6 is a more detailed schematic representation of the power train shown in FIG. 5.

The detailed construction of the power train 19 is illustrated in FIGS. 6 and 7. The directional sensor 21 is held inside the slot of the fifth wheel 8 (FIG. 3) in a horizontal plane by biasing means (not shown), and in a vertical plane by a guide 23a. The biasing means serve the important function of maintaining the sensor 21 in pressurized, resilient contact with the outer surface of the wall of the slot in the fifth wheel 8. The extension 21a is supported by first and second support members 23 and 23b. The gear 22, which is supported by and cooperates with a pair of idling gears 22b, includes a first set of teeth 22a which mesh with a second set of teeth 14a on the upper portion of the bevelled second gear 14.

At its lower end, the bevelled gear 14 includes a third set of teeth 14b which mesh with a fourth set of teeth 24b on one end of a first segment 24 of the drive shaft 32. The first segment 24 is coupled to a second segment 24a by a spline 25, which prevents relatively rotary movement of the segments 24 and 24a while permitting longitudinal movement thereof. The segment 24a is provided with a first bushing 26 to stabilize the segment 24a of the drive shaft 32, and to limit the movement of the segment 24a in any direction except longitudinally. A first universal joint (U-joint) 27 is used to couple the second segment 24a to a third segment 28, which is also provided with a second bushing 29. A second U-joint 30 is similarly used to connect the third segment 28 to a fourth segment 30a of the drive shaft 32, the fourth segment 30a being provided with a third bushing 31. The first, second, third, and fourth segments 24, 24a, 28, and 30a comprise in combination the drive shaft 32 for the power train 19 which steers the trailer 2b. The U-joints 27 and 30 allow for non-colinearity of the segments 24a, 28, and 30a.

The direction of motion is thus transmitted from the sensor 21 to the first gear 22 to the second gear 14 to the drive shaft 32 to the first gearbox 33 to the shaft 32a to the second gearbox 35 to the steering column 34. From the steering column 34 the direction of motion is transmitted to the steerable wheels 3 of the steering system for the trailer 2b. The steering column extends slantingly downward to a steering box, which drives a relay; a tie; and steering arms (not shown). The steering system includes or may include ball joints, knuckles, bearings, spindles, and other components (not shown) as required for positive wheel alignment. Such devices and methods for functionally connecting a steering column to steerable wheels of a mobile vehicle are well known in the art; see, for example, the *McGraw-Hill Encyclopedia of Science and Technology*, volume 1, pages 56, 746, 752, 753, and 755; volume 3, page 451; volume 5, page 526; and volume 13, pages 110–112, hereby incorporated by reference. The following brief description should therefore suffice. For a complete explanation, the McGraw-Hill encyclopedia should be consulted.

Figure 8:
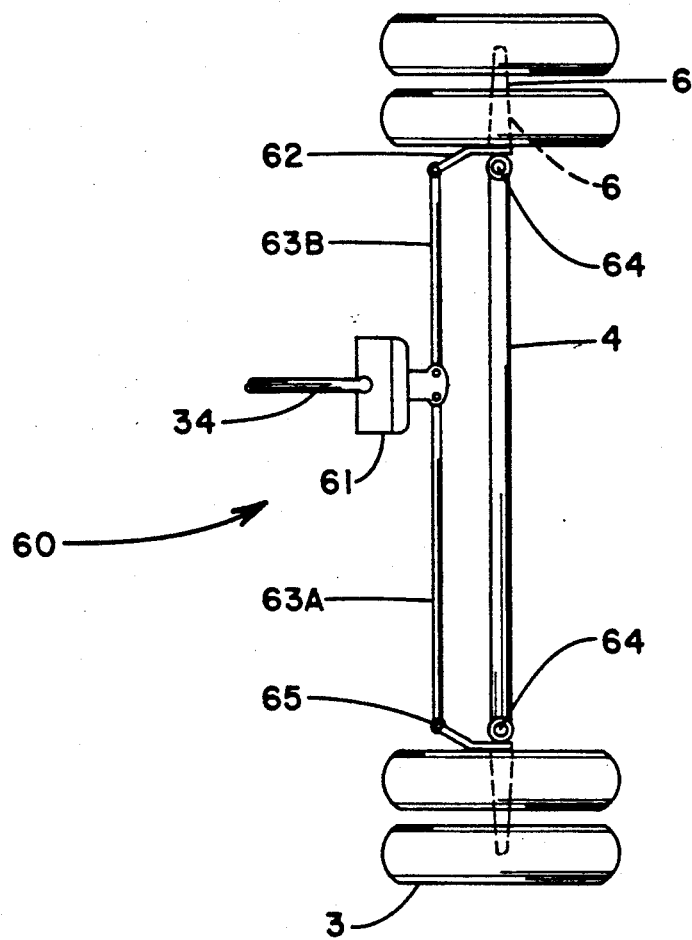
FIG. 8 is a schematic representation of part of a steering system for a trailer equipped in accordance with the principles of the present invention.

FIG. 8 represents schematically a steering system 60 for connecting the steering column 34 to the steerable wheels 3 of a trailer (not shown). The steering system 60 includes a steering gear 61, which connects the steering column 34 to tierod linkages 63a and 63b. The tierod linkages 63a, 63b are coupled to steering arms 62 and spindles 6 by ball joints 65. The spindles 6 pivot on king pins 64, which are disposed in and oriented perpendicular to an axle 4. The steerable wheels 3 are mounted on the spindles 6.

The steering system 60 may be assisted by a power booster (not shown), thereby providing power-steering for the trailer. The principal components of the power booster are a control valve, a power actuator, and a source of power. As the trailer follows a course determined and controlled by the steering system 60, the control valve senses any deviation from the prescribed position of the steerable wheels 3, and releases power to the actuator until the deviation has been corrected.

Figure 9:
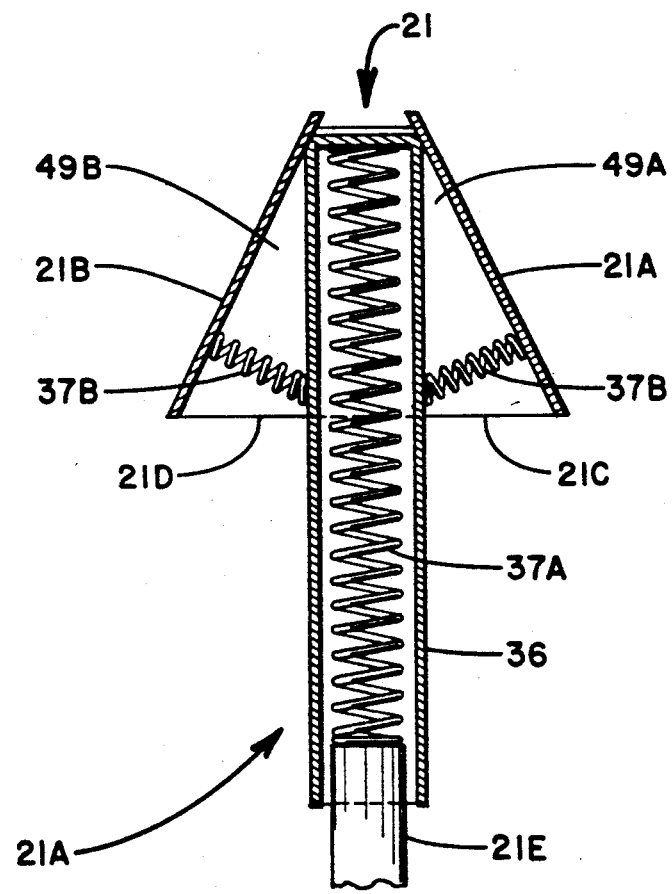
FIG. 9 is a schematic representation of a horizontal section of a first embodiment of a directional sensor made in accordance with the principles of the present invention, as viewed from above.

FIG. 9 shows the detailed construction of a first embodiment 21 of a directional sensor made in accordance with the principles of the present invention. The sensor 21 comprises an elongated passageway 36 which is closed at one end. Disposed in the elongated passageway 36 is a rigid, elongated member 21e which is fastened to the first gear 22 (FIGS. 5-7). The sensor 21 is spring-loaded against the first gear 22 by a first spring 37a; and against the inner slotted surface of the fifth wheel 8 by a pair of second springs 37b. Which connect the walls 21a, b and the passageway 36.

The sensor 21 further comprises first and second compartments 49a and 49b. The first compartment 49a is defined by a vertical wall 21a and a horizontal flap 21c, as well as by an upper horizontal flap (not shown), and by the elongated passageway 36. The second compartment 49b is defined by a vertical wall 21b and a lower horizontal flap 21d, as well as by an upper horizontal flap (not shown), and by the elongated passageway 36. The upper and lower horizontal flaps are dimensional such that the upper and lower flaps identifying each compartment 49a, 49b can slide past and partially overlap the upper and lower flaps in the corresponding opposite compartment.

Figure 10:
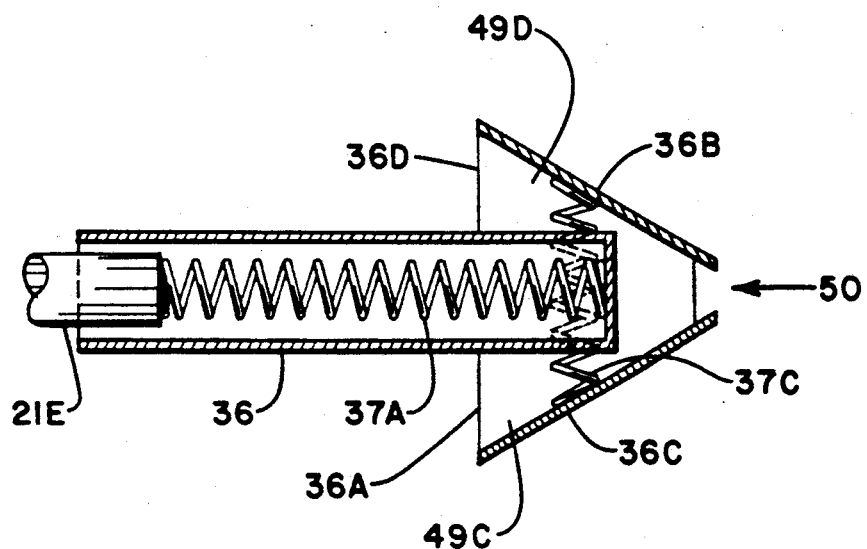
FIGS. 10 and 11 are schematic representations of horizontal sections of a second embodiment of a directional sensor made in accordance with the principles of the invention, as viewed from above, illustrating different configurations of the sensor.
Figure 11:
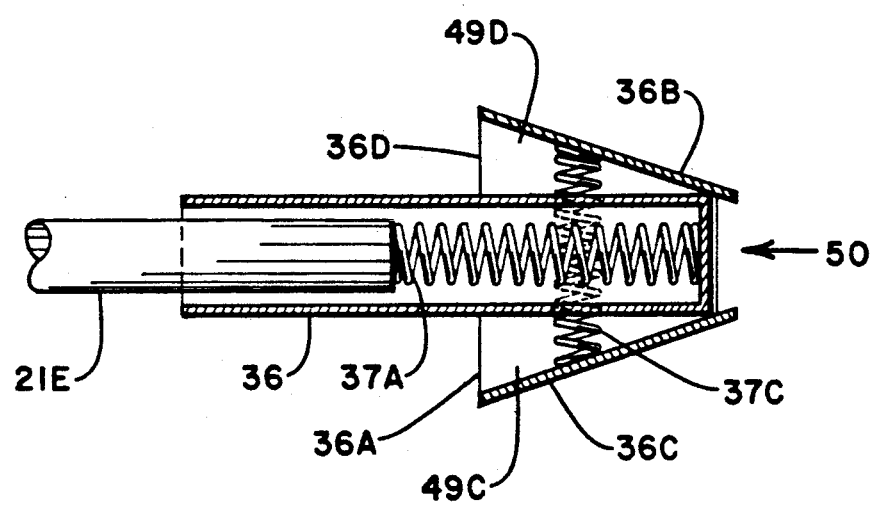

FIGS. 10 and 11 illustrate a second embodiment 50 of a directional sensor made in accordance with the principles of the present invention. The sensor 50 comprises an elongated passageway 36 which is closed at one end. Disposed in the elongated passageway 36 is a rigid, straight, elongated member 21e, one end of which is fastened to the first gear 22 (FIGS. 5-7). The sensor 50 is spring-loaded against the first gear 22 by a first spring 37a, and against the inner slotted surface of the fifth wheel 8 by a second spring 37c.

The sensor 50 further comprises first and second compartments 49c and 49d. The first compartment 49c is defined by a vertical wall 36c and a lower horizontal flap 36a, as well as by an upper horizontal flap (not shown), and by the elongated passageway 36. The second compartment 49d is defined by a vertical wall 36b and a lower horizontal flap 36c, as well as by an upper horizontal flap (not shown), and by the elongated passageway 36. The upper and lower horizontal flaps are dimensioned such that the upper and lower flaps assignable to each compartment 49c, 49d can and do slide past one another, and partially overlap the upper and lower flaps of the corresponding and opposite compartment. The second spring 37c may beneficially provide support for the passageway 36, or independent support means may connect the passageway 36 to one of the walls 36b, c. The walls 36b and 36c are biasedly and resiliently connected to one another by the second spring 37c.

Figure 12:
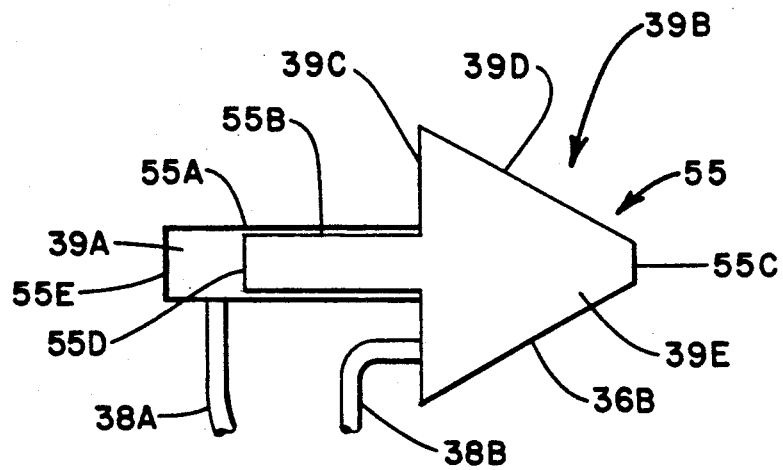
FIG. 12 is a schematic representation of a horizontal section of a third embodiment of a directional sensor made in accordance with the principles of the invention, viewed from above.

Alternatively, the sensor may be pressure-loaded between the first gear 22 and the outer surface of the wall of the fifth wheel 8 by pneumatic or hydraulic pressure. FIG. 12 shows a third embodiment 55 of a directional sensor made in accordance with the principles of the present invention. The sensor 55 comprises a flexible triangular member 39b which includes first, second, third, and fourth sides 39c, 36b, 39d, and 55c, respectively. The first side 39c includes an opening near the center of the first side and approximately opposite the shortest side 55c.

The sensor 55 further comprises a sealed first hollow, elongated member 55a which extends from the first side 39c of the triangular member 39b in a direction away from the fourth side 55c of the triangular member.

The sensor 55 further comprises a close-fitting, freely movable, flexible second hollow elongated member 55b. The second elongated member 55b is closed at one end, 55d, the other end being open and continuous with the opening in the first side 39c of the triangular member 39b. The second elongated member 55d is substantially shorter than the first elongated member 55a.

The sensor further comprises a first compartment 39a, which extends from the closed end 55d of the second elongated member 55b to the closed end 55e of the first elongated member. A second compartment 39e is enclosed by the sides 36b, 39c, 29d, 55c, and 55d.

The sensor 55 is provided with a first inlet 38a for admitting a pressurized fluid into the first compartment 39a, thereby pressure-loading the sensor into the fifth wheel; and with a second inlet 38b for admitting a pressurized fluid into the second compartment, thereby inflating the second compartment 39e and maintaining the sensor 55 in pressurized contact with the outer surface of the slot in the fifth wheel. Preferably, the fluid is a gas; even more preferably, it is air.

The sensor 55 is made of a flexible material such as poly(styrene). When the internal pressure becomes substantially greater than atmospheric, the compartment 39e expands to conform to the slot in the fifth wheel 8. At the same time, the pressure exerted against the closed end 55d of the second elongated member 55b causes the member 55b and the triangular member 39b to move into pressurized contact with the wall of the slot in the fifth wheel 8. When depressurizing the sensor 55, the inlets 38a and 38b serve as outlets.

Figure 13:
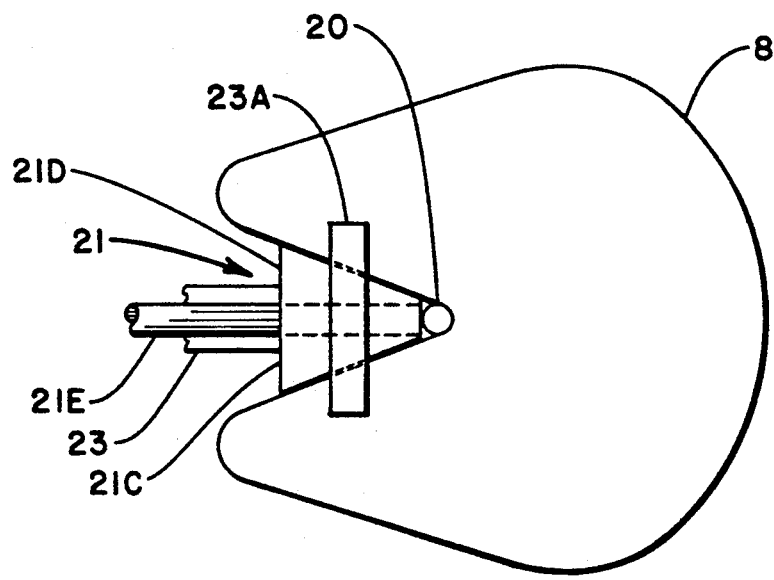
FIG. 13 is a schematic representation of a fifth wheel and of a directional sensor made in accordance with the principles of the present invention, viewed from above, showing the spatial relationship between the sensor and the fifth wheel.

FIG. 13 illustrates the "nesting" of the sensor 21 in the fifth wheel 8. While the sensor 21 has been used to illustrate the basic principle involved, it will be apparent that the same principle applies to the nesting of the sensors 50 and 55. The sensor is nested snugly in the V-slot of the fifth wheel 8 by biasing means such as springs 37a, 37b, 37c (FIGS. 9-11) or pneumatic or hydraulic pressure (FIG. 12). A king pin 20 is fastened to a plate (not shown), which is in turn fastened to the under surface of the frame 10 of the trailer 2b (FIG. 3). Inserting and removing the sensor into and from the fifth wheel 8 are automatic. Insertion takes place when the fifth wheel 8 is moved into position to couple the king pin 20 under the trailer 2b. The fifth wheel 8 is then locked to the king pin 20 by locking lugs (not shown). The sensor is removed from the fifth wheel 8 when the locking lugs are released, and the fifth wheel 8 moves away from the king pin 20.

While the invention has thus far been illustrated mostly for tractor-trailer combinations, it should be evident and is to be understood that trailers for boats, equipment, travel-trailers, and the like are included in the scope of the invention. Likewise, although the details have so far been illustrated mostly in terms of tractors, it should be clear and is also to be understood that the first (towing) vehicle may be a truck, van, or automobile. A particularly pertinent example which falls within the scope of the present invention is a fire-truck-and-trailer assembly, which presently requires manual steering of the trailer by personnel at the rear end of the trailer.

It is to be further understood that, while the sensor has been described, in the mechanical embodiments, as nesting in the V-slot of the fifth wheel of a tractor, other mechanical embodiments and arrangements are within the scope of the present invention. For example, a directional sensor could be coupled to the rear end of an automobile by means of a shaft or equivalent means. The same advantages which characterize the invention as applied to the larger tractor-trailer combinations are inherent in its application to the smaller trailers being towed by trucks or automobiles. Moreover, it is to be still further understood that the invention is applicable to a first trailer that is towed by a second trailer, the first and second trailers representing the first and second mobile vehicles, respectively.

Figure 14:
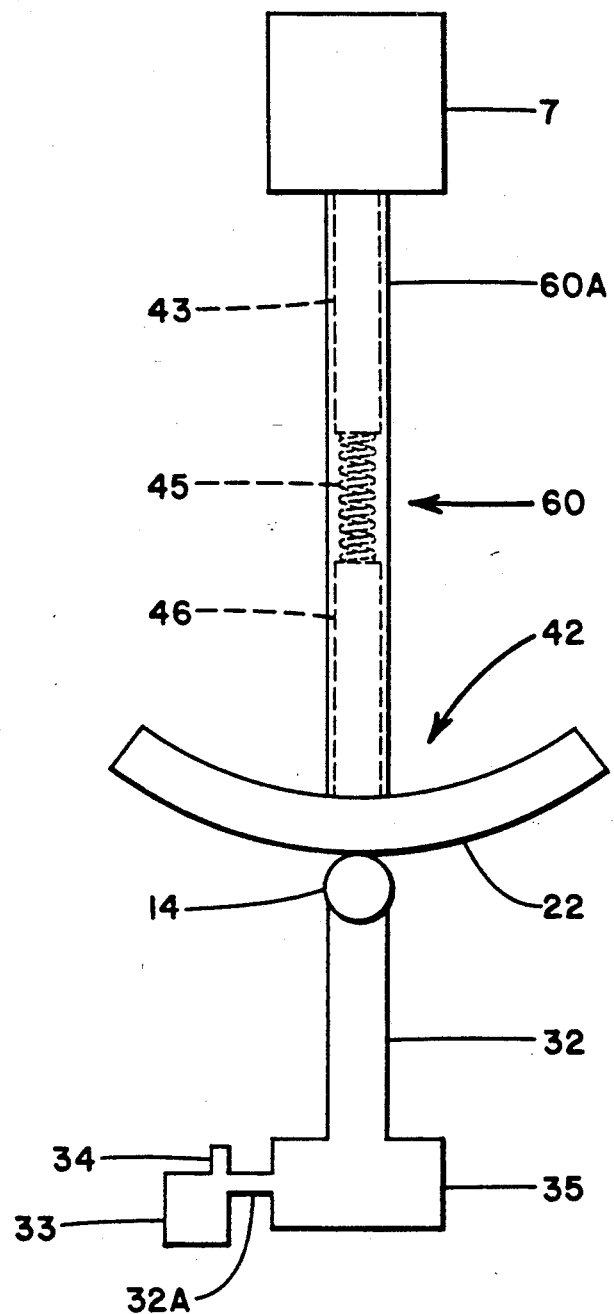
FIG. 14 is a schematic representation of a fourth embodiment of power train for a trailer equipped in accordance with the principles of the present invention.

More specifically, FIG. 14 illustrates a third embodiment 42 of a power train for a trailer equipped in accordance with the principles of the present invention. The trailer (not shown) is coupled to the frame 7 of a towing vehicle such as an automobile or truck by a fourth embodiment 60 of a directional sensor. The directional sensor 60 comprises a rigid, hollow elongated member 60a which includes a first shaft 43 fastened to the frame 7, a second shaft 46 fastened to the first gear 22, and a spring 45 connecting the first and second shafts 43 and 46. The rest of the power train 42 functions in the same manner as the other embodiments of the power trains previously described.

Figure 15:
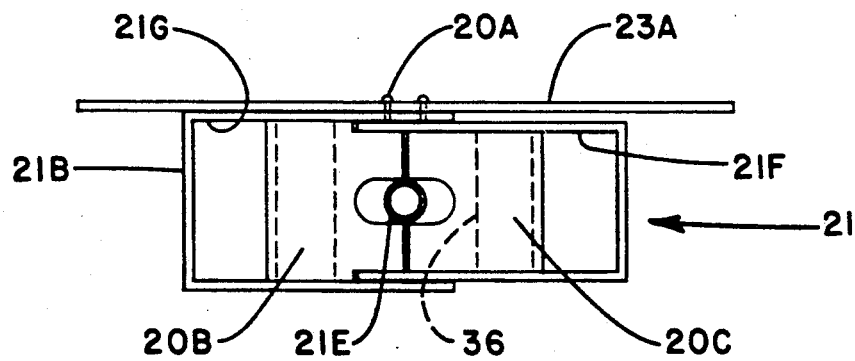
FIG. 15 is an end view, taken from the rear of the trailer, of the sensor shown in FIGS. 5-7, illustrating certain details not shown in FIGS. 5-7.
Figure 16:
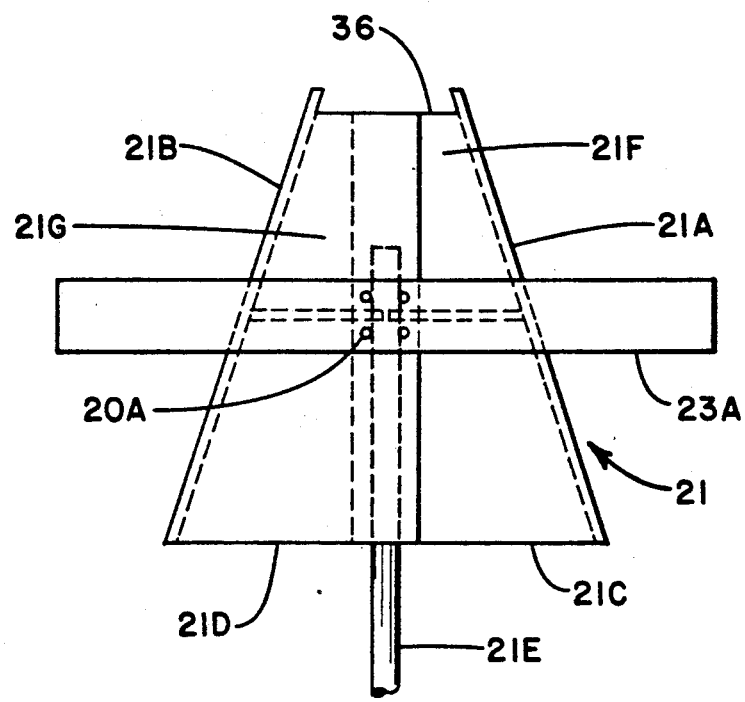
FIG. 16 is a schematic representation of the external features of the sensor shown in FIGS. 5-7, as viewed from above, illustrating certain details not shown in FIGS. 5-7.

Further details of construction of the sensor 21 are illustrated in FIGS. 15 and 16. The guide 23a is fastened to the upper horizontal flap 21g by studs, bolts, rivets, or screws 20a. The straight rigid member 21e is supported by first and second braces 20b and 20c.

The technology for steerable wheels near the front end of a trailer is taught by U.S. Pat. No. 4,740,006 to Ducote, which has been incorporated by reference. The combination of fixed wheels for pivotting, with forcibly and automatically steered wheels for steerage, is specifically addressed in this patent. This basic concept prevails in the present invention, but the arrangement or position of the fixed and steerable wheels is different.

The forward steerable wheels steer in the direction of the tractor; the rearward steerable wheels in the opposite direction. For trailers equipped with steerable wheels both near the front and near the rear thereof, first and second electronic signals, or first and second gears coupled by a gear box, are used to forcibly steer the forward and rearward steerable wheels, respectively. If only one set of steerable wheels is used, they are preferably disposed near the rear end of the trailer.

As herein disclosed, the present invention provides a solution of the problems of wheel drag, wide turn, and motional instability of towed trailers in general, and of the longer trailers in particular.

I claim:

1. A trailer steered by remote control, comprising:
   (a) a trailer having front and rear ends, and supported by a plurality of steerable wheels pivotally connected to a first fixed axle near the rear end of the trailer, and by a plurality of fixed wheels mounted on a second fixed axle, the second axle being disposed approximately midway between the first axle and the longitudinal center of the trailer;
   (b) means for coupling the trailer to towing means;
   (c) means for sensing the direction of motion of the towing means, said towing means comprising a tractor having a fifth wheel, said sensing means including a directional sensor disposed within the fifth wheel of the tractor, the sensor comprising
      ($c_1$) an elongated passageway having a closed end and an open end;
      ($c_2$) a first spring disposed in the elongated passageway, one end of the first spring fastened to the closed end of the passageway;
      ($c_3$) a straight rigid member disposed in the passageway, one end of the rigid member being fastened to the other end of the first spring, the other end of the rigid member being connected to a gear in a power train fastened to the trailer, for compressing the first spring and forcing the sensor into the slot in the fifth wheel of the tractor; and
      ($c_4$) first and second compartments on either side of the passageway having open ends, the first and second compartments being connected to one another by a second spring fastened to a wall in the first compartment and a wall in the second compartment, to hold the outer surface of the walls of the first and second compartments in pressurized contact with the outer surface of the slot in the fifth wheel and to provide support for the passageway; and
   (d) means for forcibly steering the steerable wheels suporting the trailer in accordance with the sensed direction of motion of the towing means, thereby steering the trailer by remote control.

2. The trailer of claim 1, further comprising:
   (e) a plurality of steerable wheels pivotally connected to a third fixed axle to further support and steer the trailer, the third axle disposed near the front end of the trailer.

3. A stabilized tractor-trailer combination, comprising:
   (a) a tractor having a fifth wheel;
   (b) a trailer articulated to the tractor, the trailer having front and rear ends, and including a plurality of steerable rear wheels pivotally connected to a first fixed axle, and a plurality of fixed wheels mounted on a second fixed axle, the second axle being disposed approximately midway between the first axle and the longitudinal center of the trailer;
   (c) a directional sensor disposed within the fifth wheel, for sensing the direction of motion of the tractor, the directional sensor comprising
      ($c_1$) an elongated passageway having a closed end and an open end;
      ($c_2$) a first spring disposed in the elongated passageway, one end of the first spring being fastened to the closed end of the passageway;
      ($c_3$) a straight rigid member disposed in the passageway, one end of the rigid member being fastened to the other end of the first spring, the other end of the rigid member being connected to a gear in a power train fastened to the trailer, for compressing the first spring and forcing the sensor into the slot in the fifth wheel of the tractor; and (c4) first and second compartments on either side of the passageway having open ends, the first and second compartments being connected to one another by a second spring fastened to a wall in the first compartment and a wall in the second compartment, to hold the outer surface of the walls of the first and second compartments in pressurized contact with the outer surface of the slot in the fifth wheel and to provide support for the passageway; and (d) means for forcibly steering the steerable wheels of the trailer in accordance with the sensed direction of motion of the tractor.

4. The tractor-trailer combination of claim 3, wherein:

(b) the trailer further includes a third fixed axle to which a plurality of steerable wheels are pivotally connected, the third axle disposed near the front end of the trailer.

5. A directional sensor conformable to a slot in a fifth wheel of a tractor articulated to a trailer, the sensor comprising:

(a) an elongated passageway having a closed end and an open end;

(b) a first spring disposed in the elongated passageway, one end of the spring fastened to the closed end of the passageway;

(c) a straight rigid member disposed in the passageway, one end of the rigid member fastened to the other end of the first spring, the other end of the rigid member connected to a gear in a power train fastened to the trailer, for compressing the first spring and forcing the sensor into the slot in the fifth wheel of the tractor; and (d) first and second compartments on either side of the passageway having open ends, the first and second compartments connected to one another by a second spring fastened to a wall in the first compartment and a wall in the second compartment, to hold the outer surface of the walls of the first and second compartments in pressurized contact with the outer surface of the slot in the fifth wheel, and to provide support for the passageway.

6. In a steerable trailer having front and rear ends, and equipped with a plurality of fixed wheels mounted on a first fixed axle, and with a plurality of steerable wheels pivotally connected to a second fixed axle and focibly steered in response to a sensed direction of motion of a tractor articulated to the trailer, the tractor having a fifth wheel, the improvement which comprises:

(a) disposing at least one pair of the steerable wheels near the rear end of the trailer;

(b) disposing the fixed wheels approximately midway between the longitudinal center of the trailer and the steerable wheels near the rear end of the trailer; and (c) sensing the direction of motion of the tractor by means of a directional sensor comprising (c$_1$) an elongated passageway having a closed end and an open end;

(c$_2$) a first spring disposed in the elongated passageway, one end of the first spring fastened to the closed end of the passageway;

(c$_3$) a straight rigid member disposed in the passageway, one end of the rigid member being fastened to the other end of the first spring, the other end of the rigid member being connected to a gear in a power train fastened to the trailer, for compressing the first spring and forcing the sensor into the slot in the fifth wheel of the tractor; and (c$_4$) first and second compartments on either side of the passageway having open ends, the first and second compartments being connected to one another by a second spring fastened to a wall in the first compartment and a wall in the second compartment, to hold the outer surface of the walls of the first and second compartments in pressurized contact with the outer surface of the slot in the fifth wheel, and to provide support for the passageway.

* * * * *